May 5, 1936.  C. A. RICH  2,039,347

MACHINE FOR FASHIONING ARTICLES SUCCESSIVELY FROM BAR STOCK

Filed Oct. 11, 1934  4 Sheets-Sheet 1

Witness
Chas. T. Olson

Inventor
Charles A. Rich
by Fish Hildreth
Cary & Jenney Attys.

Patented May 5, 1936

2,039,347

UNITED STATES PATENT OFFICE 2,039,347

MACHINE FOR FASHIONING ARTICLES SUCCESSIVELY FROM BAR STOCK

Charles A. Rich, Providence, R. I., assignor to Brown and Sharpe Manufacturing Company, a corporation of Rhode Island Application October 11, 1934, Serial No. 747,910

23 Claims. (Cl. 29—44)

The present invention relates to screw and similar machines for fashioning articles successively from metal bar stock.

Machines of this type are provided with a spindle assembly comprising a rapidly rotating feed tube through which the bar stock is fed, feed fingers for imparting a step-by-step advancing movement to the bar, and a chuck which is intermittently operated to grip and rotate the bar in each successive position. Cooperating with the spindle assembly there is provided a stock stop against which the newly trimmed end of the bar is fed upon the completion of the cutting off of each successive article. There is also provided in machines of this description one or more tool supporting elements which are operated in timed relation to the operation of the spindle assembly to engage the tools supported thereon with the bar stock to fashion and then to cut off the completed article. These supports normally comprise two cross slides, one of which is arranged to carry a cutting-off tool, and an additional slide movable axially of the bar of stock which preferably carries a tool supporting turret which may be indexed in timed relation to the reciprocations of the slide to cause a plurality of tools to operate successively in the fashioning of the article from the bar.

The machine herein disclosed is further provided with a magazine for storing additional stock and automatic mechanism which is controlled by the exhaustion of the old bar to select and place a new bar of stock in the machine, so that continuous operation of the machine is insured without the necessity of frequent attention on the part of the operator.

While the present invention has been applied to a machine of this general description, as more fully set forth in the patent to Rich No. 1,877,693, dated September 13, 1932, it will be understood that the several features of the invention may be equally well applied to an automatic screw or similar machine of other description which is not provided with the automatic replenishing mechanism or in which a stock stop or other stationary tool is mounted on the lengthwise movable slide in place of the turret tool support above described.

With the organization and arrangement of parts of these machines as above described, a cycle of operation is followed which consists first in feeding the leading end of the bar into operating position against a stock stop, causing the several operating tools to advance to perform the several fashioning operations, and thereafter causing the cutting-off tool to advance to cut off the completed article.

The present invention relates specifically to the provision of mechanism which is arranged in starting the operation of the machine upon a new bar of stock to prevent possible injury to the operating tools by engagement with an irregularly formed or improperly positioned leading end of the new bar prior to the first operation of the cutting-off tool which normally serves both to cut off the completed article and to trim the severed end of the bar to a predetermined shape to insure the proper engagement of the several operating tools.

In accordance with the present invention, mechanism has been provided which is rendered operative in starting the operation on a new bar to vary the operation of one or more of the tool supports above described from the usual operating cycle during the first cycle of operations of the machine to prevent the engagement of one or more of the operating tools with the leading end of the new bar prior to the operation of the cutting-off tool to prevent possible injury to or breakage of the operating tools.

The several features of the present invention consist also in the devices, combinations and arrangement of parts hereinafter described and claimed, which together with the advantages to be obtained thereby will be readily understood by one skilled in the art from the following description taken in connection with the accompanying drawings, in which

The machine disclosed in the drawings comprises an automatic screw machine having the usual organization of parts which includes a spindle assembly for positioning and feeding a bar of stock into the machine and several cooperating tool supports which are operated in timed relation to the feeding of the bar to fashion and cut off successively formed articles from the bar feeding in the machine. The spindle assembly comprises a rapidly rotating feed tube 12 through which the bar stock is fed, feed fingers 13 for imparting a step-by-step advancing movement to the bar, and a chuck 14 which is intermittently operated to grip and rotate the bar in each successive position. Cooperating with the spindle assembly there is provided a stock stop 15 against which the newly trimmed end of the bar is fed upon the completion of and cutting off of each successively formed article. In the machine illustrated in the drawings, there are provided two cross slides 16 and 17 on one of which is mounted the cutting-off tool 18, and an additional slide 19 movable axially of the bar of stock and a tool supporting turret 20 which is mounted thereon and is indexed in timed relation to the reciprocations of the slide 19 to cause the several operating tools carried thereby to operate successively in the fashioning of each article from the bar.

Figure 5:
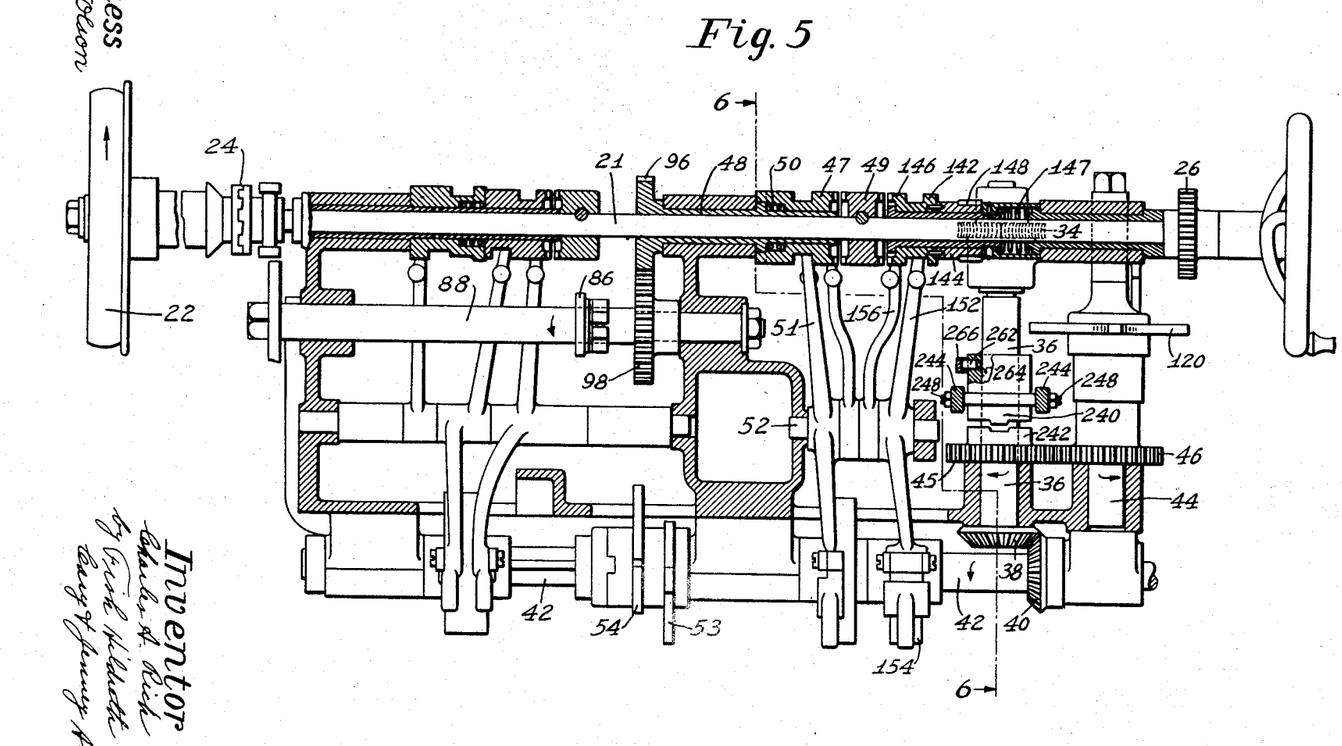
Fig. 5 is a sectional plan view illustrating particularly the main drive shaft, the several cam shafts and clutch operating levers for controlling the operation of the several cooperating mechanisms.

The several cooperating mechanisms of the automatic screw machine herein disclosed are operated in timed relation from a main drive shaft 21 best shown in Fig. 5 of the drawings, which is continuously rotated during the operation of the machine from a belt driving pulley 22 and through a main clutch 24. The drive shaft 21 is connected through reduction gearing to drive a cam shaft 42 which extends along the front side of the machine parallel to the drive shaft 21, and an auxiliary cam shaft 44 which extends laterally across the end of the machine and carries thereon a cam for imparting the required reciprocatory movements to the turret slide 19. For driving the cam shafts 42 and 44 the drive shaft 21 has mounted thereon a gear 26 which is connected through change speed gearing generally indicated at 28 in Fig. 1, to a short drive shaft 30 which is mounted directly beneath the drive shaft 21 and carries a worm 32 arranged to mesh with a worm gear 34 on a cross shaft 36. At its forward end the cross shaft 36 is provided with a bevel gear 38 arranged to mesh with a bevel gear 40 on the main cam shaft 42. The cam shaft 44 is mounted parallel to the cross shaft 36, and is driven therefrom by means of a sleeve gear 45 on the cross shaft 36 and an intermeshing gear 46 on the cam shaft 44. The cam shafts 42 and 44 are driven at an equal peripheral rate, the several cooperating parts of the machine being so arranged that one revolution of these shafts corresponds to one complete cycle of operations of the machine to feed the leading end of the bar into operating position to fashion and thereafter to cut off the completed article. The operations of the feed collet and chuck to feed and grip the bar in its advanced position are controlled through mechanisms which include clutch mechanisms sleeved on the main drive shaft 21 and moved into and out of operative position in timed relation to the operation of the machine through clutch control levers which are actuated by means of cams on the main drive shaft 42. The chuck clutch is indicated at 47 in Fig. 5 keyed to slide on a driving sleeve 48 loosely sleeved on the shaft 21, and is arranged for engagement with a corresponding clutch member formed on one face of a clutch disk 49 rigidly secured to turn with the drive shaft 21. The chuck clutch 47 is normally held in a retracted inoperative position against the pressure of a spring 50 by means of a clutch control lever 51 which is pivoted intermediate its length on a shaft 52 and is actuated to permit the engagement of the clutch 47 for a single revolution thereof, in timed relation to the cycle of operations of the machine by means of a trip device on the cam shaft 42. Inasmuch as these mechanisms are well known in the art, further description and illustration of these mechanisms has been omitted.

Figure 4:
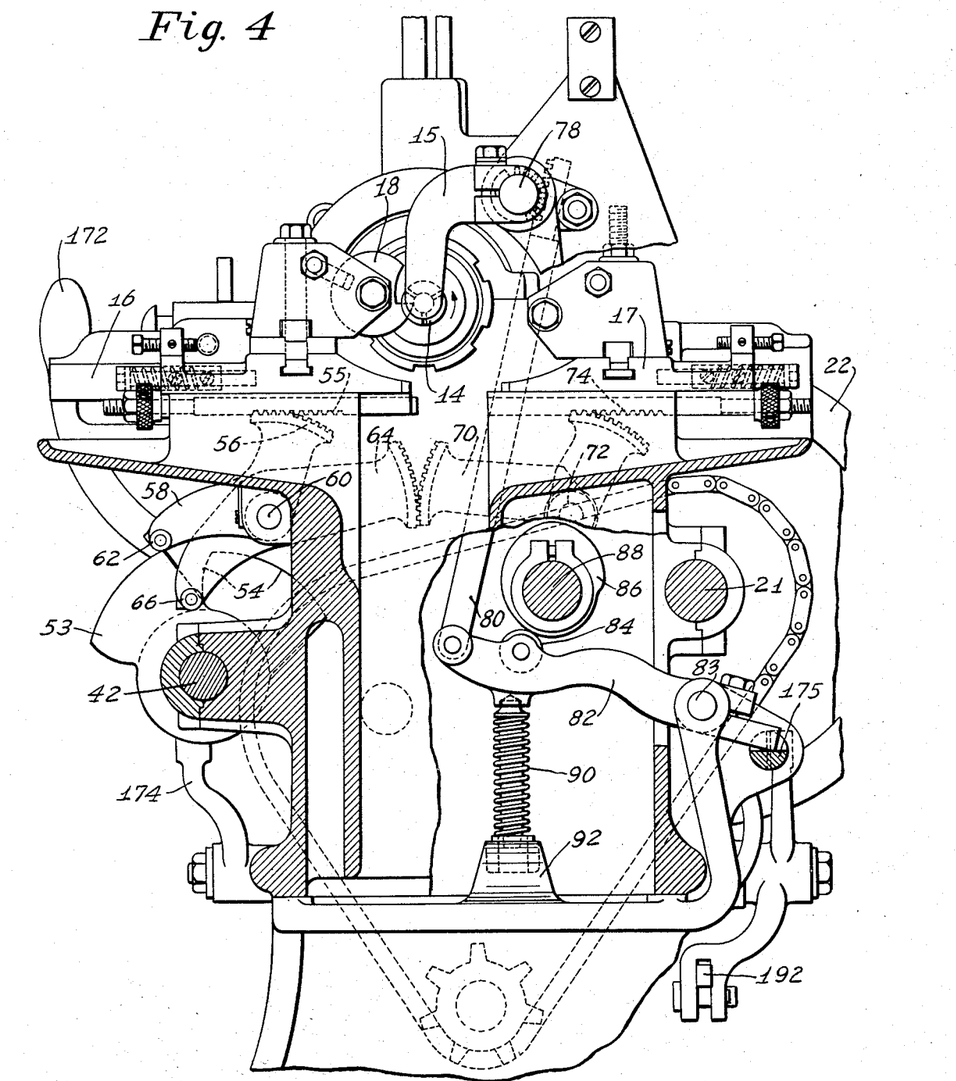
Fig. 4 is a sectional view of the machine on an enlarged scale taken substantially on a line 4—4 of Fig. 1.

The cross slides 16 and 17 as best shown in Figs. 4 and 5 of the drawings, are operated respectively by means of cams 53 and 54 mounted on the main cam shaft 42 of the machine. The slide 16 is provided on its under side with a rack 55 which is engaged by a gear segment 56 formed in the upper end of a cam lever 58 which is pivoted at 60 on the machine frame, and at its other end carries a roll 62 engaging with the cam 53. The slide 17 is similarly actuated by means of a cam lever 64 provided at one end with a roll 66 engaging the cam 54 and at its other end with a gear segment arranged to mesh with a corresponding segment formed at one end of a bellcrank lever 70 which is pivoted on a rock shaft 72 and is also provided with a gear segment arranged to mesh with a rack 74 formed in the under side of the slide 17. As illustrated in Fig. 4, a cutting-off tool 18 is mounted on the slide 16.

The stock stop 15 for the machine is moved downwardly during each cycle of operations to position the leading end of the bar feeding in the machine, and is then raised out of the path of the operating tools, by means of mechanism which is similar in its construction and mode of operation to that illustrated in the patent to Rich above referred to. As best shown in Fig. 4, the stock stop is secured to a short rock shaft 78 which has secured thereto a gear segment arranged to mesh with a rack formed on a downwardly extending link 80. The link 80 is secured at its lower end to a laterally extending cam lever 82 which is pivoted at 83 on the machine frame, and is provided with a cam roll 84 arranged to engage with a cam 86 formed on a cam shaft 88. A spring-pressed plunger 90 mounted at one end in a recess formed in a lug 92 on the machine frame and at its other end secured to the under portion of the lever arm 82 tends to maintain the cam roll 84 at all times in engagement with the cam 86. The cam shaft 88 is rotated through a complete revolution during a portion of each cycle of operations through connections which are controlled by the chuck clutch 47 above described and comprise a gear 96 secured to the clutch sleeve 48 and a gear 98 meshing therewith secured to the shaft 88.

Figures 1, 2, 3:
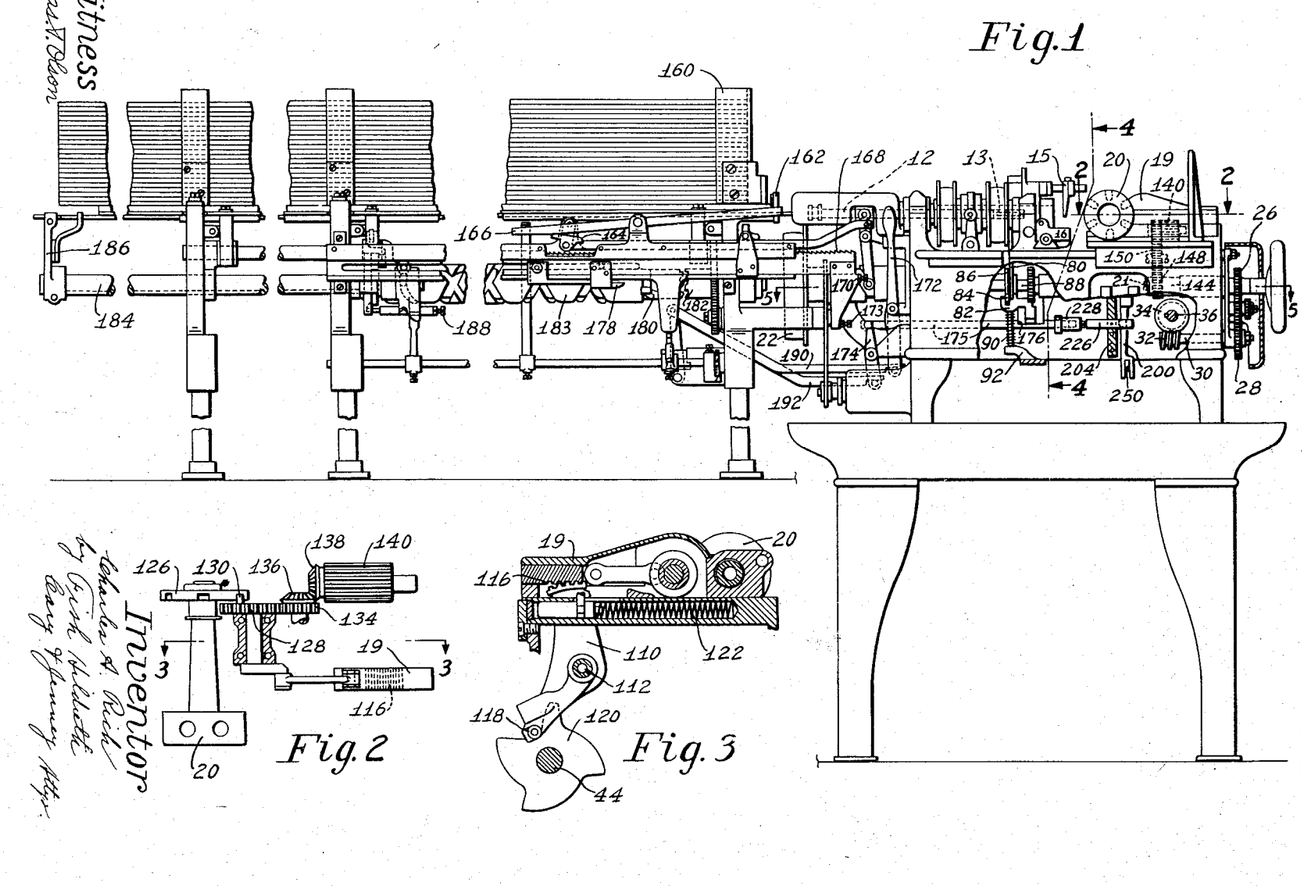
Fig. 1 is a view in front elevation of an automatic screw machine embodying the several features of the invention.
Fig. 2 is a detail plan view taken on the section line 2—2 of Fig. 1.
Fig. 3 is a detail sectional view taken on the line 3—3 of Fig. 2.

The turret slide 19 is actuated as best shown in Fig. 3 by means of a cam lever 110 pivoted at 112 to the machine frame, and provided at one extremity with a gear segment arranged to mesh with a corresponding rack 116 on the turret slide 19 and at its other extremity with a cam roll 118 which is arranged to engage with a cam generally indicated at 120 in the drawings, mounted on the cross cam shaft 44. A compression spring 122 seated in a recess in the frame and arranged at its rear end to engage with a portion of the slide 75

19, tends to move the slide rearwardly to maintain the roll 118 always in engagement with the actuating cam 120.

The indexing mechanism for the turret 20 as best shown in Figs. 1, 2 and 5, comprises a Geneva motion including an index wheel 126 secured to rotate with the turret, a gear 128 provided with a pin 130 arranged to engage successively in corresponding grooves in the index wheel, and driving connections which include a gear 134, bevel gears 136 and 138, and a relatively long spur gear 140 which is mounted parallel to the direction of travel of the turret slide 19. The connections above described are intermittently driven to cause the turret to be indexed in timed relation to the advancing movements of the slide 19 by means of a one revolution turret indexing clutch 142 which is keyed to a sleeve 144 loosely mounted to turn on the drive shaft 21, and is arranged to mesh with a corresponding clutch member 146 formed on one face of the disk 49 secured to the drive shaft 21. A compression spring 147 coiled about the drive shaft 21 tends to force the sleeve 144 and clutch member 142 yieldingly into driving relation to the clutch member 146. A gear 148 formed on the sleeve 144 is arranged to mesh with an idler gear 150 which in turn meshes with the gear 140, so that a single indexing movement is imparted to the turret for each revolution of the clutch. The clutch 142 is rendered operative to rotate the sleeve 144 through a single revolution with the drive shaft 21 to index the turret, and is then disconnected through connections which comprise a clutch control lever 152 which acts normally to maintain the clutch 142 and sleeve 144 in an inoperative position against the pressure of the spring 147 and is tripped at predetermined points in the cycle of operations to permit the engagement of the clutch for a single revolution thereof by means of adjustable cam dogs (not shown) on a cam disk 154 carried on the main cam shaft 142. A stop lever 156 is provided to arrest the rotation of the clutch in a predetermined angular position at the end of each revolution of the clutch. Inasmuch as the construction and mode of operation of these mechanisms for actuating the turret and turret slide as thus far described are well known in the art, no further description of these parts is believed necessary.

The present machine as best shown in Fig. 1, is also provided with a magazine 160 for storing additional stock, and with an automatically operating replenishing mechanism substantially similar to that illustrated in the inventor's prior Patent No. 1,877,693, which is rendered operative upon the exhaustion of the old bar feeding in the machine to stop the machine, with the stock stop 15 in raised inoperative position, to select and advance a new bar into the machine, and thereafter to set the machine again in operation. This mechanism briefly comprises a drop lever 162 which normally rests upon the bar feeding in the machine, a reciprocating pawl 164 which is normally held out of operation by means of a lever 166 supported at its right hand end on the drop lever 162 and having its rear end overlying the tail of the pawl, and a feed rack 168 which is given a step-by-step advancing movement by the pawl 164 when the pawl is released by the dropping of the drop lever 162 as the rear end of the old bar rides out from under the lever. The advancing movements of the timing rack 168 are arranged upon the completion of the last article from the old bar, to engage an abutment 170 on the rack with the starting and stopping lever 172 of the machine to disengage the machine clutch 24 above described, and to engage an abutment 173 on the rack 170 with a vertical lever arm 174 to advance a rod 175 pivotally connected thereto so that an abutment 176 formed on the rod 175 is located under the tail of the cam lever 82 to maintain the stock stop in its raised inoperative position. The advance of the timing rack 168 also acts to cause a cam-shaped abutment 178 formed on the under side of the rack to engage with and depress a clutch lever 180 generally indicated in Fig. 1, to engage a clutch 182, so that a spiral feed cam 183 is rendered operative to cause a new bar to be dropped into operating position, to cause the drop lever 162 and pawl 164 to be returned to their raised inoperative position, and thereafter to cause the advance of a feed rod 184 and push member 186 to engage with and push a new bar into operating position in the machine. As the feed rod 184 reaches the limit of its advancing movement, an abutment 188 on the rod 184 is brought into engagement with two control rods 190 and 192 connected respectively to the starting and stopping lever 172 and to the lever arm 174 for the control rod 175 to again engage the machine clutch and to retract the rod 175 to permit the normal operation of the stock stop 15 as above described. Upon the return of the feed rod 184 and pusher member 186 to their normal inoperative position, the clutch 182 is again disengaged so that the parts are returned to the initial positions illustrated in Fig. 1.

Figure 6:
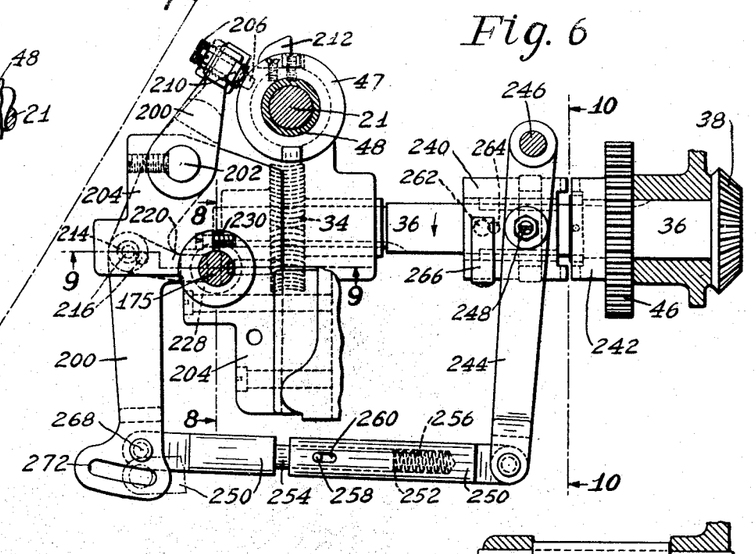
Fig. 6 is a sectional view taken on the line 6—6 of Fig. 5 to illustrate particularly the mechanism for disengaging the indexing mechanism for the turret and the reciprocating mechanism for the turret slide.
Figure 7:
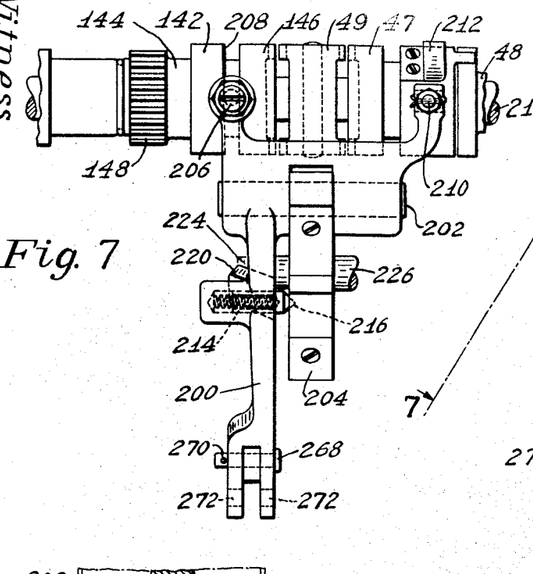
Fig. 7 is a view of the parts illustrated in Fig. 6 taken substantially on the line indicated at 7—7 in Fig. 6.

In carrying out the present invention, mechanism is provided which acts automatically in starting the operation of the machine upon a new bar, to render either or both of the turret and turret slide actuating mechanisms inoperative during the first cycle of operations, so that operating tools supported thereon will not be brought into operative engagement with the leading end of the new bar until after the first operation of the cutting-off tool to trim the leading end of the bar to a predetermined shape. With the present embodiment of the invention, the mechanism for maintaining the turret indexing mechanism out of operation during the first operation on the new bar, comprises a control lever 200 as best shown in Figs. 6 and 7 of the drawings which is loosely sleeved to turn on a pivot shaft 202 rigidly secured to a bracket 204 on the machine frame. At its upper end the control lever 200 is forked, one arm having screw-threaded thereto a pin 206 arranged for engagement in a groove 208 formed in the periphery of the clutch member 142, the other arm of the fork having mounted therein a pointed pin 210 arranged for engagement with a cam 212 formed on the periphery of the chuck clutch 47 above referred to. The control lever 200 is normally held in a retracted inoperative position to which it is returned by the engagement of the cam 212 with the pin 210 by means of a spring-pressed detent plunger 214 which is arranged for yielding engagement in one of two recesses 216 formed in the bracket 204 to maintain the control lever 200 in either of its two alternative positions. There is also formed on the control lever 200 an offset arm 220 which carries a cam pin 222 arranged for engagement with a cam surface 224 formed on the end of a rod 226 which is adjustably secured to and moves axially with the control rod 175 above described for maintaining the stock stop 15 out of operation during the operation of the replenishing mechanism to place a new bar of stock in the machine. The rod 226 is secured to the rod 175 by means of a bracket 228 which is provided with a split clamp 230 adjustably fitted over the end of the rod 175, and with a tight bolt 232 which is screw-threaded into the end of the rod 226. The operation of this mechanism as applied to the machine illustrated in applicant's prior Patent No. 1,877,693 above referred to and briefly outlined above, is as follows:—The advancing movement of the rod 175 and rod 226 secured thereto to maintain the stock stop 15 out of operating position upon stopping the machine, operates to engage the cam surface 224 with the pin 222 to rock the control lever 200 to the right in a clockwise direction as illustrated in Fig. 6, to bring the pin 206 into engagement with the groove 208, so that the turret indexing clutch 142 is positively locked in its inoperative position against the pressure of its operating spring 147 independently of the operation of the clutch control lever 152 above described. The control lever 200 is then maintained in this operating position by the engagement of the spring-pressed detent 214 with the corresponding recess in the bracket 204 as the rods 175 and 226 are again withdrawn to the normal operating position upon the starting of the operation upon the new bar. The control lever 200 is permitted to remain in the operative position illustrated in Fig. 6 during substantially the whole of the first cycle of operations on the new bar until the actuation of the chuck clutch 47 subsequent to the cutting-off operation to release the bar and permit the feeding of the trimmed end against the stock stop preparatory for the beginning of the next cycle of operations upon the next succeeding portion of the new bar. The rotation of the chuck clutch causes the cam 212 to engage the pin 210 to move the control lever in a counterclockwise direction from the position illustrated in Fig. 6 to withdraw the pin 206 from the groove 208, so that the turret indexing clutch is permitted to again operate in a normal manner.

The device above described is of particular advantage to prevent possible injury to tools mounted on the turret which would be brought into engagement with the untrimmed leading end of the new bar by the usual indexing movements of the turret prior to the first cutting-off operation. An instance may be cited where the first advancing movement of the turret slide causes a centering tool mounted on the turret to form an indentation in the leading end of the bar and the subsequent indexing and advancing movements of the turret causes a drill to engage with the indentation to drill a hole axially into the end of the bar. With such a set-up, if the untrimmed leading end of the new bar is irregularly formed and the new bar has not been advanced far enough to permit the engagement of the centering tool therewith during the first cycle of operations, the subsequent engagement of the drill with such an irregular surface may cause the drill to be deflected and broken or to enter the work off center and drill a hole incorrectly in the end of the bar.

In order to take care of other situations, as for instance where a forming tool is mounted on the turret to perform the first operation on the work before indexing, or where the turret has been removed and a single forming or other tool is mounted directly on the slide, mechanism is provided with the present construction to render the slide advancing mechanism inoperative to advance the slide during the first cycle of operations on the leading end of a new bar prior to the operation of the cutting-off tool. This mechanism comprises a single position clutch member 240 which is slidably mounted on and keyed to turn with the cross shaft 36, and is normally maintained in driving engagement with a correspondingly formed clutch face 242 on the sleeve hub of the driving gear 45 which forms a part of the slide reciprocating mechanism above described. The position of the clutch 240 is controlled by means of a clutch yoke 244 pivoted at its upper end to a pivot shaft 246, and has mounted thereon two pins 248 arranged to engage in a groove formed in the periphery of the clutch member 240. A downwardly extending arm of the clutch yoke 244 is connected by means of a link 250 with a downwardly extending portion of the control lever 200, so that the movement of the control lever 200 into operative position upon stopping the machine as above described, will operate to disengage the clutch 240, and the subsequent return of the control lever 200 to its inoperative position by the engagement of the cam 212 with the pin 210 at the end of the first cycle of operations on the new bar will operate to again move the clutch 240 into operative engagement with the driving gear 45. The link 250 is made in two parts, one having formed therein a recess 252 into which is fitted a reduced end portion 254 of the other part. A compression spring 256 mounted in the base of the recess tends to maintain the two parts of the link in an extended position which is determined by the engagement of a pin 258 formed on the reduced end 254 with a slot 260 in the other of said parts. With this arrangement of the parts, a yielding connection is provided to permit the return of the clutch 240 to operating position as the engaging surfaces of the single position clutch come into register subsequent to the return movement of the control lever 200 under the influence of the cam 212. The clutch 240 is held yieldingly in its operating position by the engagement of a pin 262 journalled in the clutch member 240 with a corresponding recess 264 in the drive shaft 36. The pin 262 is secured at its outer end to a spring clip 266 which tends to force the pin 262 yieldingly into engagement with the recess 264.

Figures 8, 9:
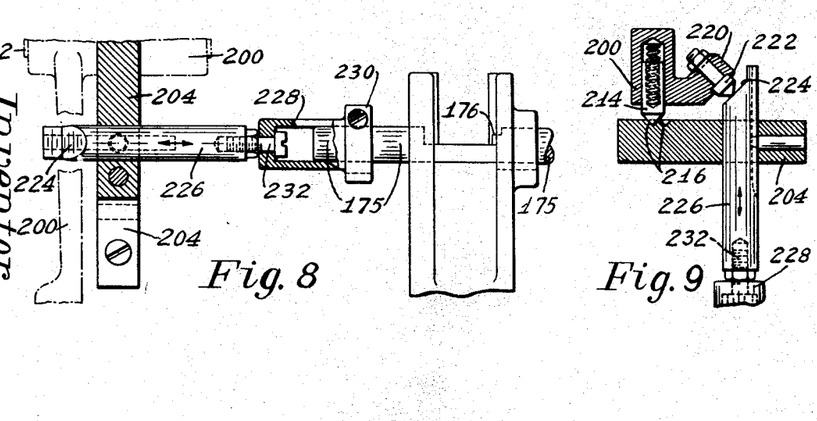
Fig. 8 is a detail sectional view taken on the line 8—8 of Fig. 6.
Fig. 9 is a detail sectional plan view taken on the line 9—9 of Fig. 6 looking from below.
Figure 10:
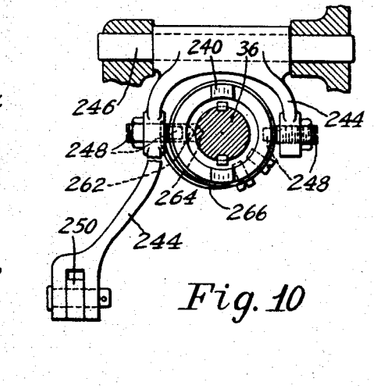
Fig. 10 is a detail sectional view taken on the line 10—10 of Fig. 6.

The link 250 is connected to the lower end of the control lever 200 by means of a pivot pin 268 which as illustrated in Figs. 6 and 7, is fitted through holes drilled in the forked lower end of the control lever 200 and through a corresponding hole drilled in the end of the link 250, and is held in place by means of a small cotter pin 270 as shown in Fig. 7. If it be desired to render the mechanism for disengaging the clutch 240 inoperative, so that the operation of the control lever may be utilized only to prevent the operation of the turret indexing mechanism during the first cycle of operations on the new bar, the connecting pin 268 may be withdrawn and fitted through two slotted portions 272 formed in the forked lower end of the lever arm 200. Similarly, the movement of the lever arm 200 may be rendered ineffective to disconnect the turret indexing mechanism during the first cycle of operations on the new bar by backing off the screw-threaded pin 236 so that the movement of the control lever 200 to the operative position shown in Fig. 6, will not operate to engage the pin 206 with the cam groove 208 in the indexing clutch member 142. The entire mechanism for rendering the turret indexing and turret slide reciprocating mechanisms inoperative during the first cycle of operations, may be disconnected by unclamping and shifting the bracket 228 to the right as viewed in Fig. 8, so that the advancing movement of the rod 174 and control rod 226 connected thereto will not operate to engage the cam surface 224 with the pin 222 to prevent the operation of the control lever 200.

While the invention is herein disclosed in its preferred form as applied to an automatic screw machine provided with the magazine and automatic replenishing mechanism illustrated in applicant's prior patent above referred to, it will be readily understood that the operation of this mechanism is not necessarily dependent upon the operation of the automatic replenishing mechanism above described, but may be controlled by means of other suitable devices rendered operative in stopping and starting the machine.

The invention having been described, what is claimed is:

1. A machine for fashioning articles successively from bar stock comprising means for feeding a bar to present successive portions to the work engaging tools, an operating tool assembly including a cutting-off tool arranged to sever successively positioned portions of bar stock, a separate tool support movable to engage a tool with each of said successively positioned portions of bar stock, and means rendered operative upon starting the operation on a new bar to vary the operation of said movable support during the operation upon the first of said successive portions of a new bar to maintain said tool out of engagement with the work.

2. In a machine for fashioning articles successively from bar stock, a bar feeding assembly comprising mechanism for feeding a bar to present successive portions to the work engaging tools, mechanism for rotating the bar while engaged by the tools, an operating tool assembly including a cutting-off tool support, a movable forming tool support, mechanism for actuating each of said supports, means for timing the operation of each of said mechanisms to feed, form and thereafter to cut off the completed article, and means for varying the operation of said forming tool support during the operation upon the first of said successive portions of a new bar to maintain the forming tool out of engagement with the work.

3. A machine for fashioning articles successively from bar stock comprising feeding mechanism to present successive portions to the work engaging tools, mechanism for rotating the bar while engaged by the tools, means for interrupting the operation of the machine to position a new bar of stock in operating position in said feed mechanism, an operating tool assembly including a cutting-off tool arranged to sever successively positioned portions of bar stock, a separate tool support, means for moving said tool support to engage a tool supported thereby with each of said successively positioned portions of bar stock, and devices controlled by the operation of said interrupting means to render said means for moving the tool support inoperative during the operation upon the first of said successive portions of the new bar to maintain said tool out of engagement with the work.

4. A machine for fashioning articles successively from bar stock comprising means for feeding a bar to present successive portions to work engaging tools, mechanism for rotating the bar while engaged by the tools, a tool support, means for moving said support to engage a tool supported thereby with each of successively positioned portions of bar stock, a cutting-off tool, mechanism for advancing said cutting-off tool in timed relation to the operation of said tool support to cut off successively fashioned portions of the bar stock, and means to render inoperative said means for moving the support during the operation on the first of said successive portions of the new bar to maintain said tool out of engagement with the work.

5. A machine for fashioning articles successively from bar stock comprising feeding mechanism to present successive portions to the work engaging tools, mechanism for rotating the bar while engaged by the tool, means for interrupting the operation of the machine to position a new bar of stock in operating position in said feeding mechanism, a tool support, means for moving said tool support to engage a tool supported thereby with each of said successively positioned portions of bar stock, a cutting-off tool, mechanism for actuating said cutting-off tool in timed relation to the operation of said support to cut off successively fashioned portions of the bar stock, and devices controlled by the operation of said interrupting means to render said tool support actuating means inoperative during the operation upon the first of said successive portions of the new bar to maintain said tool out of engagement with the work.

6. A machine for fashioning articles successively from bar stock comprising feeding mechanism to present successive portions to the work engaging tools, mechanism for rotating the bar while engaged by the tools, an operating tool assembly including a cutting-off tool support, mechanism for actuating said support to cut off successively fashioned portions of the bar stock, a tool turret, a turret slide, an indexing mechanism for said turret, mechanism for reciprocating said slide, driving connections for actuating said indexing and reciprocating mechanisms in timed relation and for thereafter actuating said cutting-off mechanism to sever successively formed articles from the feeding bar stock, and means to render one of said reciprocating and indexing mechanisms inoperative during the operation upon the first of said successive portions of a new bar.

7. A machine for fashioning articles successively from bar stock comprising feeding mechanism to present successive portions to the work engaging tools, mechanism for rotating the bar while engaged by the tools, an operating tool assembly including a cutting-off tool support, mechanism for actuating said support to cut off successively fashioned portions of bar stock, a tool turret, a turret slide, an indexing mechanism for said turret, mechanism for reciprocating said slide, driving connections for actuating said indexing and reciprocating mechanisms in timed relation and for thereafter actuating said cutting-off mechanism to sever successively formed articles from the feeding bar stock, and means to render said indexing mechanism inoperative during the operation upon the first of said successive portions of the new bar.

8. A machine for fashioning articles successively from bar stock comprising feeding mechanism to present successive portions to the work engaging tools, mechanism for rotating the bar while engaged by the tools, an operating tool assembly including a cutting-off tool support, mechanism for actuating said support to cut off successively fashioned portions of bar stock, a tool turret, a turret slide, an indexing mechanism for said turret, mechanism for reciprocating said slide, driving connections for actuating said indexing and reciprocating mechanisms in timed relation and for thereafter actuating said cutting-off mechanism to sever successively formed articles from the feeding bar stock, and means to render said reciprocating mechanism inoperative during the operation upon the first of said successive portions of the new bar.

9. A machine for fashioning articles successively from bar stock comprising feeding mechanism to present successive portions to the work engaging tools, mechanism for rotating the bar while engaged by the tools, an operating tool assembly including a cutting-off tool support, mechanism for actuating said support to cut off successively fashioned portions of bar stock, a tool slide movable axially of said bar, mechanism for reciprocating said slide, driving connections for actuating said slide and cutting-off tool support in timed relation to form and thereafter to sever successively formed articles from the feeding bar stock, and means to render said reciprocating mechanism inoperative during the operation upon the first of said successive portions of the new bar.

10. A machine for fashioning articles successively from bar stock comprising feeding mechanism to present successive portions to the work engaging tools, mechanism for rotating the bar while engaged by the tools, an operating tool assembly including a cutting-off tool support, mechanism for actuating said support to cut off successively fashioned portions of bar stock, a tool slide movable axially of said bar, mechanism for reciprocating said slide including a clutch, driving connections for actuating said cutting-off tool support and said slide in timed relation to form and thereafter to sever successively formed articles from the feeding bar stock, and means to disengage said clutch during the operation upon the first of said successive portions of the new bar, and thereafter to engage the clutch.

11. A machine for fashioning articles successively from bar stock comprising feeding mechanism to present successive portions to the work engaging tools, an operating tool assembly including a cutting-off tool arranged to sever successively positioned portions of bar stock, a separate tool support, means for moving said tool support to engage a tool supported thereon with each of said successively positioned portions of bar stock, mechanism for rotating the bar while engaged by the tools, a magazine for storing additional stock, a replenishing mechanism acting automatically when rendered operative to engage a new bar of stock from the magazine with said feeding mechanism, and means controlled from said replenishing mechanism to render said tool support actuating means inoperative during the operation upon the first of said successive portions of the new bar to maintain said tool out of engagement with the work.

12. A machine for fashioning articles successively from bar stock comprising feeding mechanism to present successive portions to the work engaging tools, mechanism for rotating the bar while engaged by the tools, a magazine for storing additional stock, a replenishing mechanism acting automatically when rendered operative to engage a new bar of stock from the magazine with said feeding mechanism, a stock stop, means for actuating said stock stop to position the leading end of the bar during each feeding operation, an operating tool assembly including a cutting-off tool support, mechanism for actuating said support to cut off successively fashioned portions of the bar stock, a tool turret, a turret slide, an indexing mechanism for said turret, mechanism for reciprocating said slide, driving connections for actuating said stock stop, indexing and reciprocating mechanisms in timed relation, and for thereafter actuating said cutting-off mechanism to sever successively formed articles from the feeding bar stock, and means controlled by the operation of said replenishing mechanism to maintain said stock stop out of the path of the leading end of the new bar and to render one of said reciprocating and indexing mechanisms inoperative during the operation upon the first of said successive portions of the new bar.

13. In a machine for fashioning articles successively from bar stock, a bar feeding assembly comprising feeding mechanism to present successive portions to the work engaging tools, and mechanism for rotating the bar while engaged by the tools, an operating tool assembly including a cutting-off tool support, a tool turret, a turret slide, an indexing mechanism for said turret, and mechanism for reciprocating said slide, driving connections for actuating the elements of said feeding assembly and of said operating tool assembly in timed relation to form and thereafter to sever successively formed articles from the feeding bar stock, a starting and stopping clutch for the machine, means for disconnecting one of said indexing and reciprocating mechanisms during one cycle of operations only of the machine to form and sever an article from the feeding bar, and connections actuated in timed relation to the operation of said starting and stopping clutch to actuate said disconnecting means during the operation on the first of said successive portions of a new bar.

14. In a machine for fashioning articles successively from bar stock, a bar feeding assembly comprising mechanism for feeding a bar to present successive portions to the work engaging tools, mechanism for rotating the bar while engaged by the tools, an operating tool assembly including a cutting-off tool support, a movable forming tool support, mechanism for actuating each of said supports, a timing mechanism including a cam shaft for timing the operation of each of said mechanisms to feed the bar formed and thereafter to cut off the completed article, a control lever controlled by said timing mechanism when rendered operative to disconnect said turret indexing mechanism during one cycle of operations to form and cut off an article, and means rendered operative in beginning the operation on a new bar for actuating said control lever.

15. In a machine for fashioning articles successively from bar stock, a bar feeding assembly comprising feeding mechanism to present successive portions to the work engaging tools, mechanism for rotating the bar while engaged by the tools, an operating tool assembly including a cutting-off tool support, a tool turret, a turret slide, mechanism for indexing said turret including a part revolution clutch, mechanism for reciprocating said slide, a replenishing mechanism acting automatically upon the exhaustion of a bar feeding in the machine to engage a new bar of stock in said feeding assembly, a timing mechanism including a cam shaft for timing the operation of each of said mechanisms including said part revolution clutch to feed the bar, form and thereafter cut off the completed article, a control lever arranged when rendered operative to maintain said part revolution clutch out of operation to disconnect said indexing mechanism, means controlled by said cam shaft for moving said control lever to inoperative position at the end of one cycle of operations to produce an article, and means controlled by the replenishing mechanism for moving said lever to operative position for the first-cycle of operations upon a new bar.

16. In a machine for fashioning articles successively from bar stock, a bar feeding assembly comprising feeding mechanism to present successive portions to the work engaging tools, mechanism for rotating the bar while engaged by the tools, an operating tool assembly including a cutting-off tool support, a tool turret, a turret slide, mechanism for indexing said turret including a part revolution clutch, mechanism for reciprocating said slide including a cam and a single position clutch, a replenishing mechanism acting automatically upon the exhaustion of a bar feeding in the machine to engage a new bar of stock in said feeding assembly, a timing mechanism including a cam shaft for timing the operation of each of said mechanisms including said part revolution clutch to feed the bar, form, and thereafter cut off the completed article, a control lever having alternative operative and inoperative positions, connections controlled thereby for maintaining said part revolution clutch out of operation to disengage the indexing mechanism, connections controlled by said lever to disengage said single position clutch, connections actuated by said replenishing mechanism in starting the operation on a new bar to move said control lever to operative position, and means controlled from said cam shaft to move said control lever to inoperative position at the end of one cycle of operations to produce an article.

17. In a machine for fashioning articles successively from bar stock, a bar feeding assembly comprising feeding mechanism to present successive portions to the work engaging tools, a chuck mechanism including a part revolution clutch for rotating the bar while engaged by the tools, an operating tool assembly including a cutting-off tool support, a tool turret, a turret slide, mechanism for indexing said turret including a part revolution clutch, mechanism for reciprocating said slide, a replenishing mechanism acting automatically on the exhaustion of a bar feeding in the machine to engage a new bar of stock in said feeding assembly, a timing mechanism including a cam shaft for timing the operation of each of said mechanisms including said part revolution clutches to feed the bar, form, and thereafter to cut off the completed article, a control lever arranged when rendered operative to maintain said indexing part revolution clutch out of operation to disconnect said indexing mechanism, means rendered operative by the operation of the chuck clutch at the end of a cycle of operations to move said lever to inoperative position, and means controlled by the replenishing mechanism for moving said lever to operative position for the first cycle of operations upon the new bar.

18. In a machine for fashioning articles successively from bar stock, a bar feeding assembly comprising feeding mechanism to present successive portions to the work engaging tools, a chuck mechanism for rotating the bar while engaged by the tools, chuck control mechanism operated by a single revolution clutch, an operating tool assembly including a cutting-off tool support, a movable tool support, mechanism for moving said support to engage a tool with each of successively positioned portions of bar stock, a replenishing mechanism acting automatically upon the exhaustion of a bar feeding in the machine to introduce a new bar of stock in said feeding assembly, a timing mechanism including a cam shaft for timing the operation of each of said mechanisms including said single revolution clutch to feed the bar, form and thereafter cut off the completed article, a control lever arranged when rendered operative to disconnect said mechanism for moving said tool support, means controlled by the replenishing mechanism for moving said lever to operative position for the first cycle of operations upon a new bar, and means controlled by the operation of said first mentioned single revolution clutch for moving said control lever to inoperative position at the end of one cycle of operations to produce an article.

19. A machine for fashioning articles successively from bar stock comprising feeding mechanism to present successive portions to the work engaging tools, an operating tool assembly including a forming tool support, mechanism for moving said support to engage a forming tool with successively presented portions of bar stock, a cutting-off tool for cutting off successively formed portions of bar stock, a replenishing mechanism controlled automatically upon the exhaustion of the old bar to engage a new bar of stock in said feeding mechanism, means controlled by the operation of said replenishing mechanism to render said forming tool actuating mechanism inoperative during the operation upon the first of said successive portions of the new bar, and a manually operable control device for stopping and starting the machine independently of the operation of said replenishing mechanism and means controlled thereby.

20. A machine for fashioning articles successively from bar stock comprising feeding mechanism to present successive portions to the work engaging tools, an operating tool assembly including a forming tool support, mechanism for moving said support to engage a forming tool with successively presented portions of bar stock, a cutting-off tool for cutting off successively formed portions of bar stock, a stock stop, mechanism for actuating said stock stop to position the leading end of the bar during each feeding operation, a replenishing mechanism controlled automatically upon the exhaustion of the old bar to engage a new bar of stock in said feeding mechanism, means controlled by the operation of said replenishing mechanism to maintain said stock stop out of the path of the leading end of the new bar and to render said forming tool actuating mechanism inoperative during the operation upon the first of said successive portions of the new bar, and a manually operable control device for stopping and starting the machine independently of the operation of said replenishing mechanism and means controlled thereby.

21. A machine for fashioning articles successively from bar stock comprising feeding mechanism to present successive portions to the work engaging tools, means for rotating the bar while engaged by the tools, a magazine for storing additional stock, a replenishing mechanism controlled automatically by the exhaustion of the old bar to engage a new bar of stock from the magazine with said feeding mechanism, a stock stop, mechanism for actuating said stock stop to position the leading end of the bar during each feeding operation, an operating tool assembly including a cutting-off tool support, mechanism for actuating said support to cut off successively fashioned portions of the bar stock, a tool turret, a turret slide, an indexing mechanism for said turret, mechanism for reciprocating said slide, driving connections for actuating said stock stop, indexing and reciprocating mechanisms in timed relation, and for thereafter actuating said cutting-off mechanism to sever successively formed articles from the feeding bar stock, means controlled by the operation of said replenishing mechanism to mainta'n said stock stop out of the path of the leading end of the new bar and to render one of said reciprocating and indexing mechanisms inoperative during the operation upon the first of said successive portions of the new bar, and a manually operable control device for stopping and starting the machine independently of the operation of said replenishing mechanism and means controlled thereby.

22. A machine for fashioning articles successively from bar stock comprising with a plurality of work engaging tools, means for feeding a bar to present successive portions to the work engaging tools, means for actuating said tools to fashion and cut off successive portions of bar stock, and means rendered operative upon the starting of the operation on a new bar to maintain certain only of said tools out of engagement with the work during the operation upon the first of said successive portions of the new bar.

23. A machine for fashioning articles successively from bar stock comprising means for feeding a bar to present successive portions to the work engaging tools, a fashioning tool, a cutting-off tool, means for actuating said tools to fashion and cut off successive portions of bar stock, and means rendered operative upon starting the operation on a new bar to maintain said fashioning tool out of engagement with the work during the operation of the first of said successive portions of the new bar.

CHARLES A. RICH.